No. 703,040. W. BONHAM. Patented June 24, 1902.
CAR FENDER.
(Application filed Nov. 8, 1900.)

(No Model.)

Witnesses:
C. H. Raeder
T. E. Turpin

Inventor
William Bonham
By James J. Sheehy
Attorney

THE NORRIS PETERS CO., PHOTO-LITHO., WASHINGTON, D. C.

UNITED STATES PATENT OFFICE.

WILLIAM BONHAM, OF PHILADELPHIA, PENNSYLVANIA.

CAR-FENDER.

SPECIFICATION forming part of Letters Patent No. 703,040, dated June 24, 1902.

Application filed November 8, 1900. Serial No. 35,822. (No model.)

*To all whom it may concern:*

Be it known that I, WILLIAM BONHAM, a citizen of the United States, residing at Philadelphia, in the county of Philadelphia and State of Pennsylvania, have invented new and useful Improvements in Car-Fenders, of which the following is a specification.

My invention relates to improvements in that class of car-fenders which are normally held a slight distance above the ground in order to clear small obstructions and are adapted when struck by a person or object to automatically assume such a position as to enable them to pick up such person or object and carry the same clear of the surface. It is designed more particularly as an improvement upon the fender disclosed in my Letters Patent No. 633,636, of September 26, 1899; and it consists in a certain peculiar construction, the novelty, utility, and advantages of which will be fully understood from the following description and claim, when taken in connection with the accompanying drawings, in which—

Figure 1:
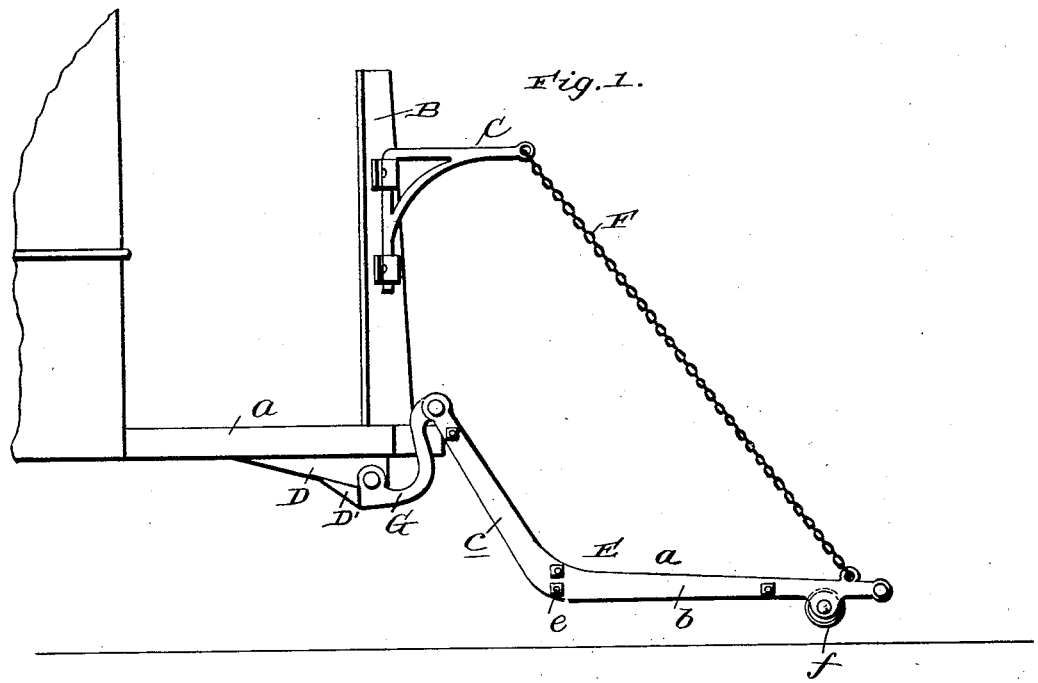
Figure 2:
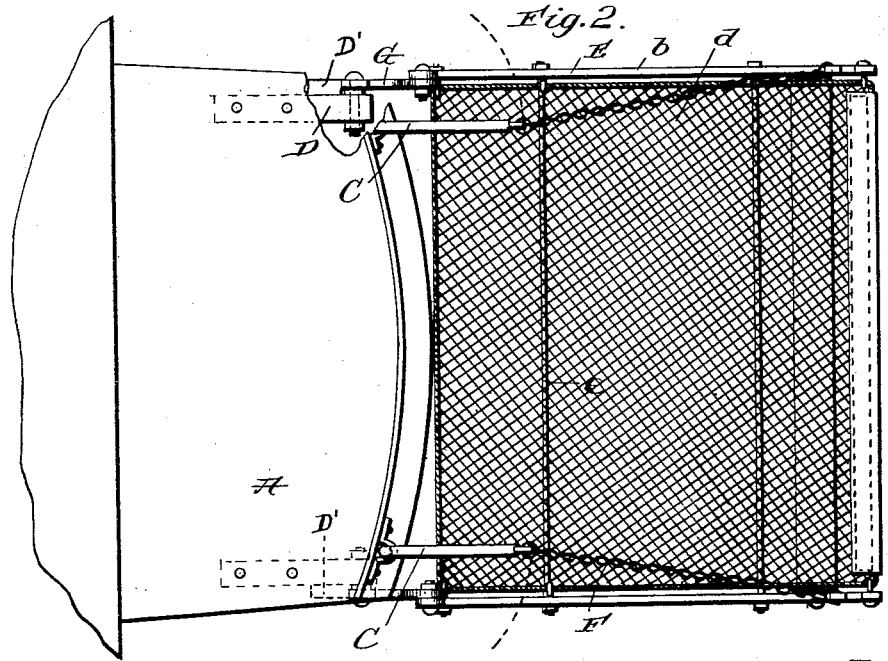

Figure 1 is a side elevation illustrating a portion of a car equipped with my improvements, and Fig. 2 is a plan view of the same with a portion of the car-platform partly broken away.

Referring by letter to the said drawings, A is the platform of a car, which is provided with the usual dashboard B.

C C are arms pivotally connected to the dashboard, so as to enable them to swing in a horizontal plane.

D D are brackets connected to the under side of the platform A, adjacent to the forward edge thereof, and E is the fender proper of my improvements. The said fender proper in the preferred embodiment of the invention comprises side bars $a$ of approximate obtuse-angle form, which have horizontal forward arms $b$ and upwardly and rearwardly inclined rear arms $c$, a flexible netting $d$, interposed between and connected to the side bars $a$ and conforming in shape to the same—that is to say, having a forward horizontal portion and a rear upwardly and rearwardly inclined portion—transverse rods interposed between and connecting the side bars $a$, and a rubber-covered roller or buffer $f$ of any suitable description connected to the side bars adjacent to the forward ends thereof and disposed below the netting. The buffer $f$ has for its purpose to prevent injury to the fender proper when the forward end engages a person or other object and is thereby depressed.

While I prefer to employ the specific fender proper just described, I do not desire to be understood as confining myself to the same, as any other fender proper suitable to the purposes of my invention may be employed.

F F are chains interposed between and connected to the forward ends of the horizontally-swinging arms C and the forward portions of the side bars $a$ of the fender proper, and G represents levers which are pivotally connected to the brackets D and extend forwardly from the same and thence upwardly, so as to clear the forward edge of the platform A, and are pivotally connected at their forward and upper ends to the rear ends of the side bars $a$ of the fender proper. The levers G are preferably S-shaped, as shown, although they may be of any other shape suitable to the purpose of my invention, and they are normally held in the position shown by stops D', with which the brackets D are provided, the said stops being disposed below and in a vertical plane in rear of the point at which the levers are connected to the brackets, whereby it will be observed that while they will not interfere with the upward and rearward swinging movements of the levers they will limit the downward movement of said levers and normally support the same in the position illustrated.

By virtue of the suspension of the forward portion of the fender proper, E, from the arms C and the interposition of the levers G between the rear end of the fender and the platform of the car it will be seen that the fender proper is normally carried above the surface of the railway, and consequently is not liable to be injured by frictional wear or contact with small obstructions on such surface. It will also be seen that when the forward end of the fender proper engages the body of a person or any other large obstruction on the track the fender will be moved rearwardly and its forward end will be depressed so as to take under the person or object, while its rear end will be moved upwardly to lessen the liability of the person or object coming in contact with the car-platform when received in the fender proper. Moreover, it will be observed that when the person or object is received in the fender proper the weight causes the fender proper to reassume its normal position (shown in Fig. 1) and enables it to carry the person or object above the surface of the railway until the car is stopped.

It will be appreciated from the foregoing that my improved fender is not liable to seriously injure a person whom it strikes and may be depended upon to effectually prevent such person getting under the wheels of the car.

The pivotal connection between the fender proper and the levers G, permits of the fender proper being swung up against the dashboard of the car when not in use and against the arms C, which are adapted to be swung to one side, after the manner illustrated by broken lines in Fig. 2.

As will be readily observed, when a person is received in the fender the levers G enable the rear end of the fender proper to give upwardly and rearwardly, so as to lessen the shock, and consequently the liability of seriously injuring such person.

While equally as efficient as the fender disclosed in my aforesaid Letters Patent, it will be noticed that my present fender is a material simplification of the same, and hence may be produced and sold with profit for a much smaller price.

Having described my invention, what I claim, and desire to secure by Letters Patent, is—

In a car-fender, the combination of a car having a platform and a dashbaord thereon, arms pivotally connected to the dashboard so as to swing in a horizontal plane, a fender proper comprising side bars having approximately horizontal forward portions and upwardly and rearwardly inclined rear portions, the upper and rear ends of which are disposed in front of and above the platform, connections interposed between the side bars and a netting conforming in shape to said side bars, flexible suspending devices interposed between the arms on the dashboard and the forward portions of the side bars of the fender proper, brackets on the under side of the car-platform provided with stops, and levers pivotally connected to the brackets above and in front of the stops thereof and extending forwardly from the brackets and thence upwardly, and pivotally connected at their forward ends to the rear ends of the side bars of the fender proper, substantially as and for the purpose set forth.

In testimony whereof I have hereunto set my hand in presence of two subscribing witnesses.

WILLIAM BONHAM.

Witnesses:
F. W. NEWELL,
BELLA D. BERKHEISER.